May 8, 1962 G. D. SHELTON-V 3,033,472
SPRAYING OF LIQUID PLASTIC AND AN ADDITIVE MATERIAL
Filed Nov. 18, 1957 6 Sheets-Sheet 1

INVENTOR.
GEORGE D. SHELTON V
BY Fulwider Mattingly & Huntley
ATTORNEYS

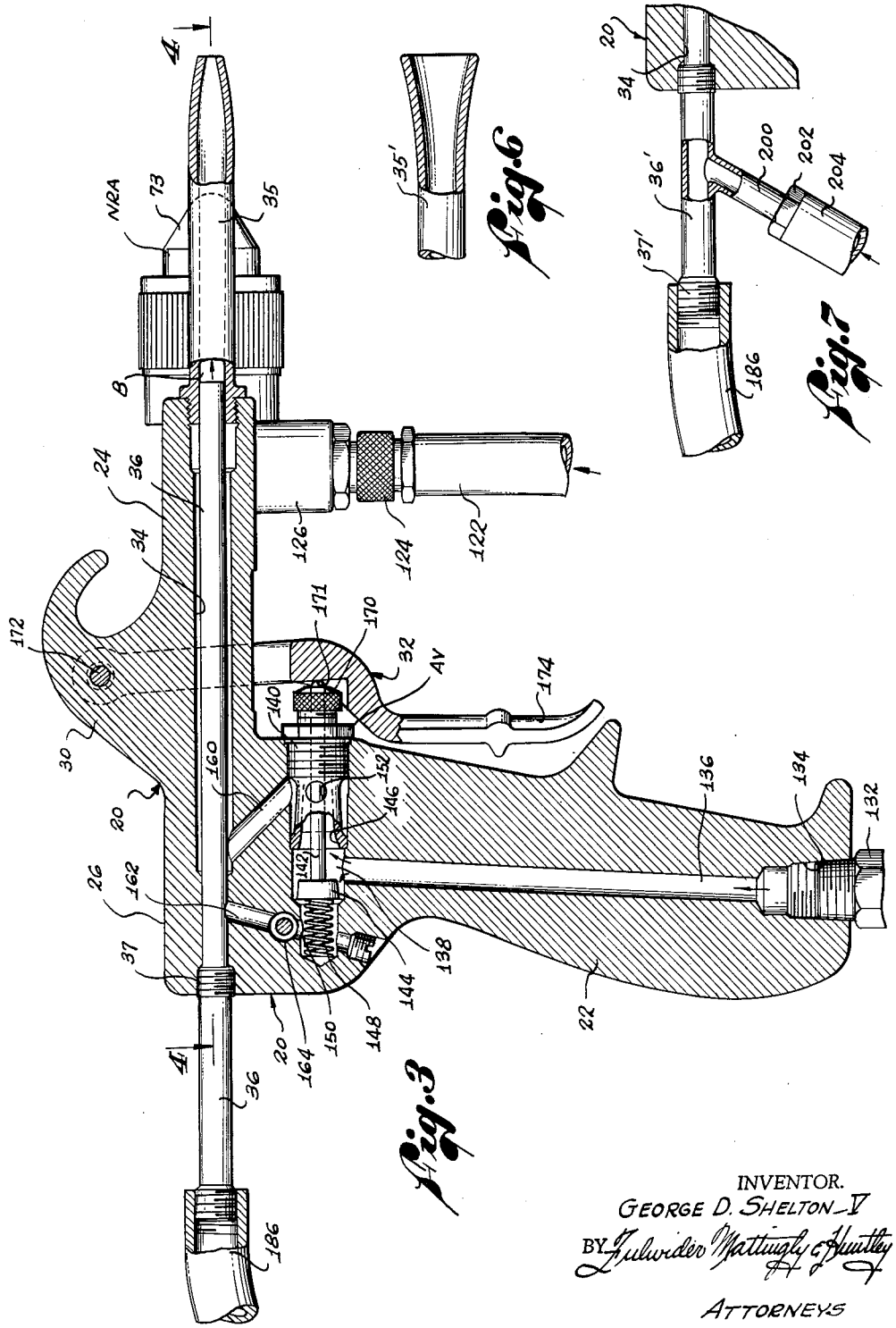

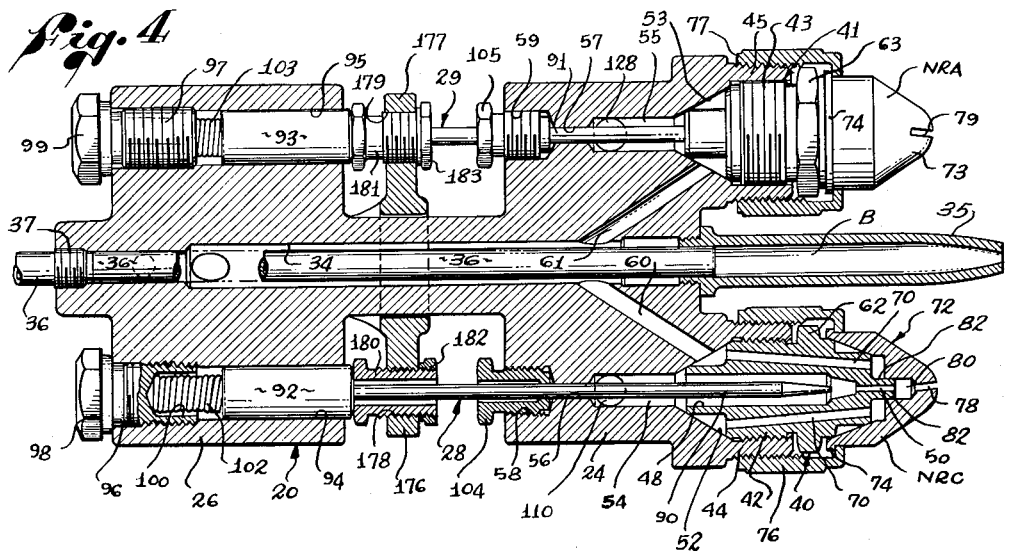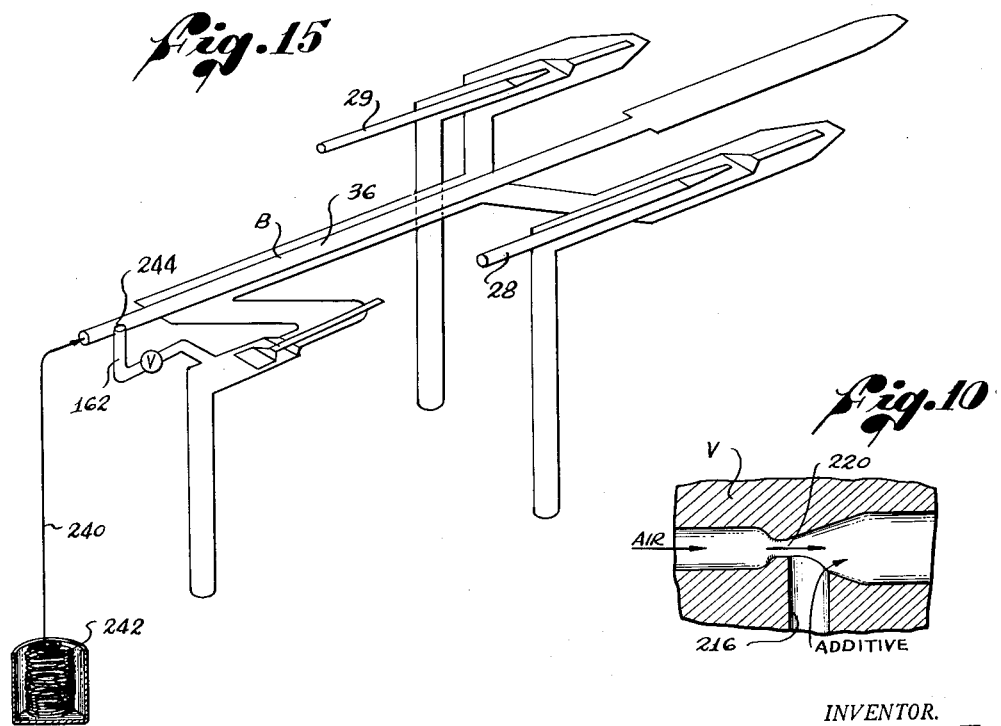

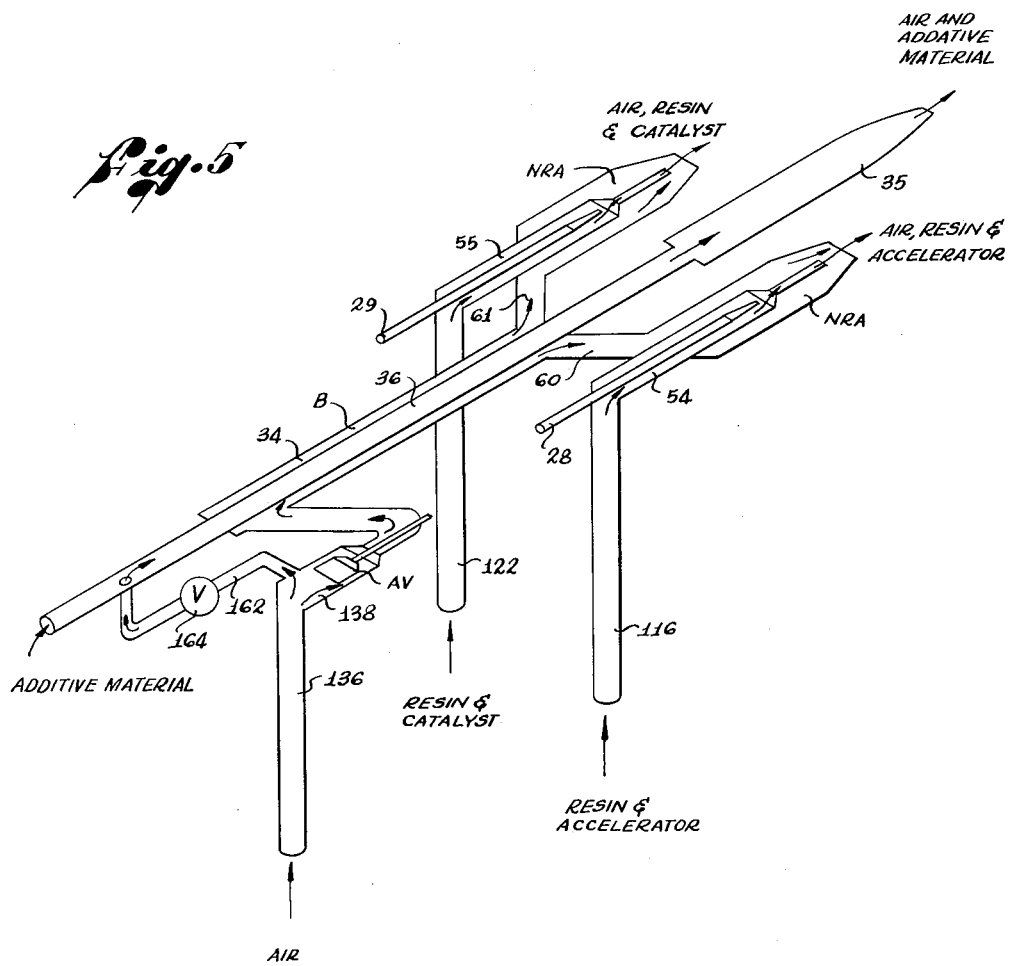

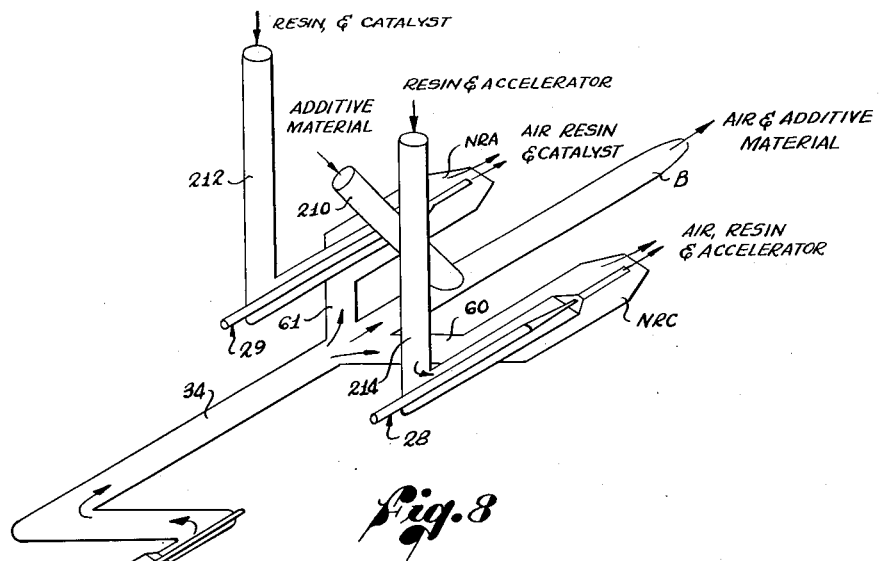
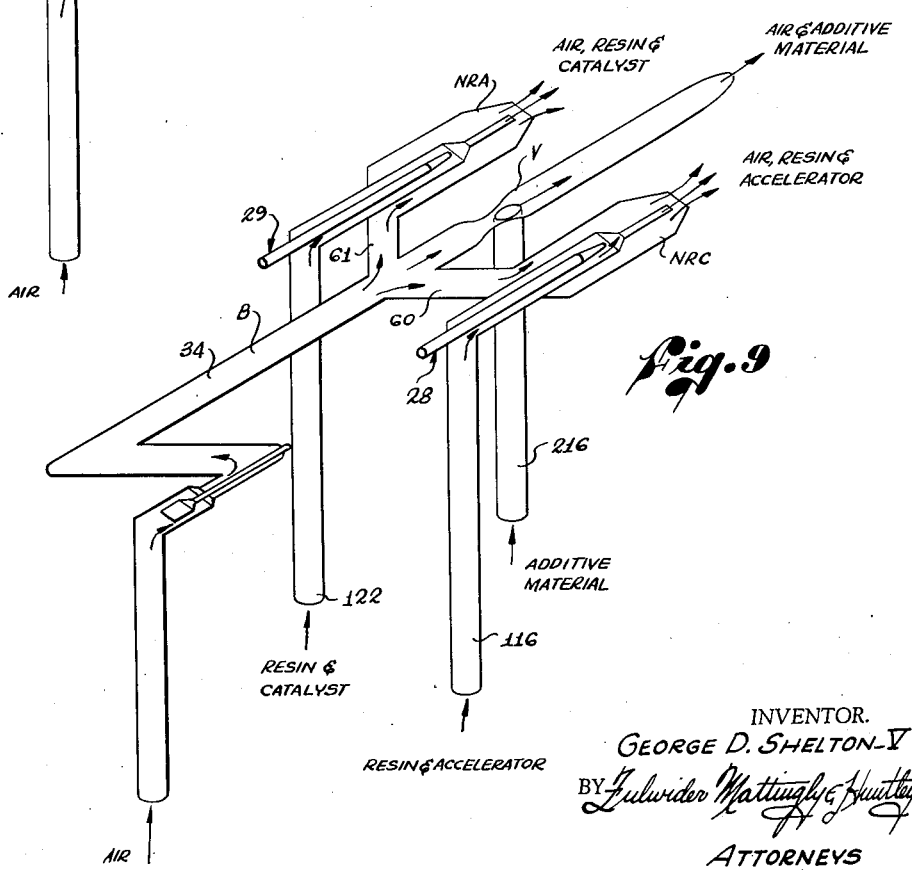

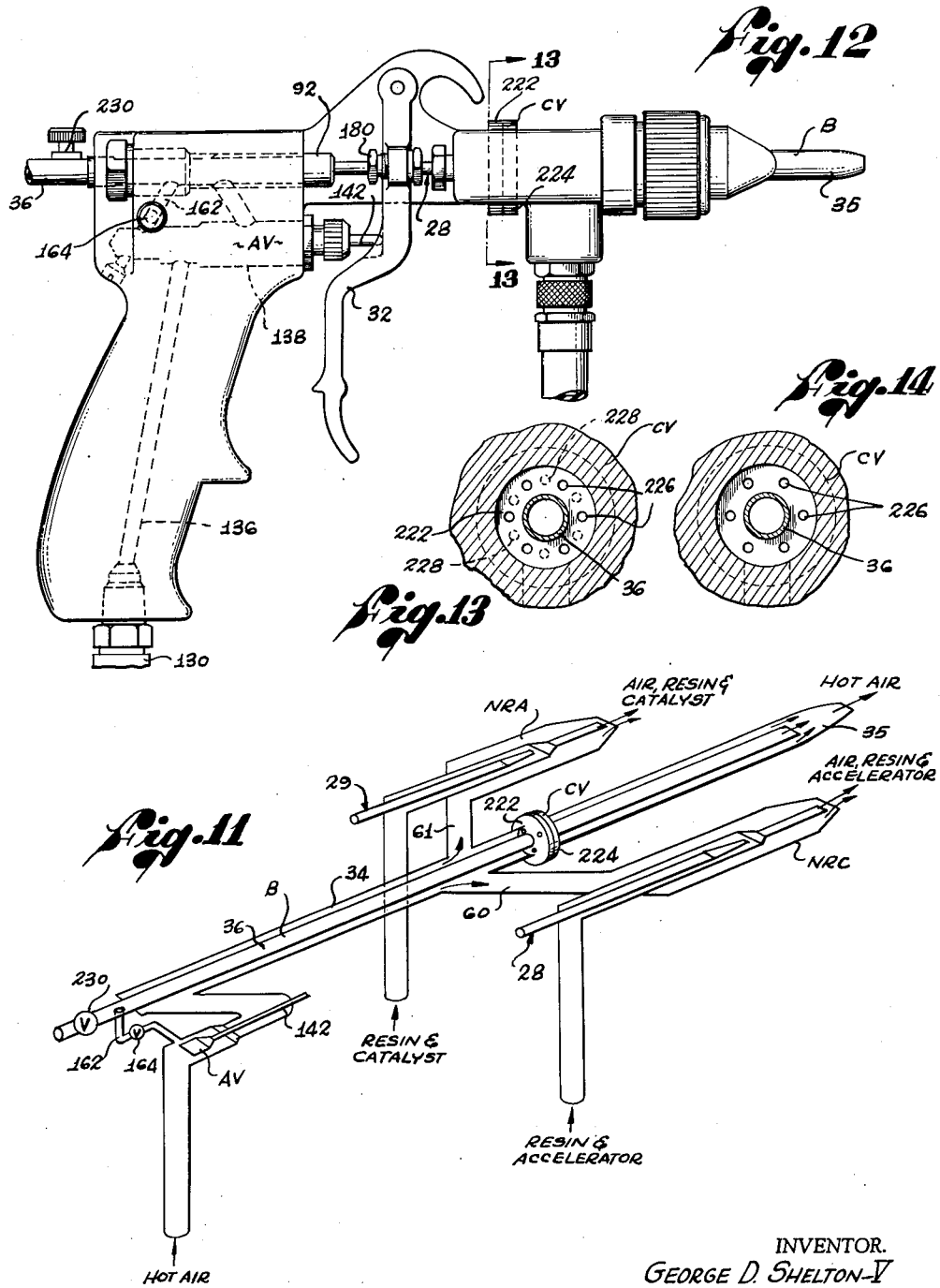

United States Patent Office 3,033,472
Patented May 8, 1962

3,033,472
SPRAYING OF LIQUID PLASTIC AND AN ADDITIVE MATERIAL
George D. Shelton-V, Riverside, Calif., assignor, by mesne assignments, to The Flintkote Company, New York, N.Y., a corporation of Massachusetts
Filed Nov. 18, 1957, Ser. No. 697,040
4 Claims. (Cl. 239—408)

The present invention relates generally to the field of plastics and more particularly to a novel method and apparatus for spraying liquid plastic and an additive material.

In co-pending patent application Serial No. 501,760, filed April 18, 1955 by Francis E. Barrett, now Patent No. 2,813,751, issued November 19, 1957, there is shown and described a spray gun particularly adapted for spraying liquid plastics of the polyester resin type. A main feature of the Barrett spray gun resides in the division of a polyester resin into two separate solutions, one solution comprising a mixture of polyester resin and a catalyst and the other solution comprising a mixture of polyester resin and an accelerator. The two solutions are simultaneously sprayed upon an object to be coated by means of a double nozzle spray gun, one nozzle discharging the solution of polyester resin and catalyst and the other discharging the solution of polyester resin and accelerator. The Barrett spray gun eliminates the difficulty common with prior spraying apparatus resulting from the fact that it is necessary to add both a chemical catalyst and a chemical accelerator to the liquid resin in order to get the latter to cure at ordinary temperatures within a reasonable period of time. Prior to the provision of the Barrett spray gun, such mixing was carried out in a single container from which the resulting solution was then sprayed through a spray gun having a single nozzle. Since the proportions of the polyester resin, the catalyst and the accelerator are determined both by the temperature at which the resulting solution will exist and the air pressure used in the spraying process, should the temperature of air pressure change appreciably during the spraying process, the original proportions will not be correct. Additionally, once the three materials are mixed together in a single container the resulting solution will immediately begin to cure. This necessitates that the spraying job with the prior spraying equipment be completed within a comparatively short period of time. If the spraying operation is interrupted for more than a minimum amount of time, the spraying equipment can easily become clogged and require disassembly and cleaning. Such disassembly and cleaning is a time-consuming and difficult job.

It is a main object of the present invention to provide spray gun apparatus generally similar to the spray gun shown and described in the aforementioned Barrett patent, but utilizing in addition to the double nozzle arrangement, a third barrel through which a different additive material is adapted to be forced simultaneously with the spraying of the liquid plastic through the double nozzles.

Another object of the present invention is to provide a spray gun of the aforedescribed nature utilizing a single compressed air inlet for urging materials through both liquid plastic discharging nozzles and the third barrel.

An additional object of the invention is to provide spray gun apparatus of the aforedescribed nature that is simple of design and rugged of construction whereby it may afford a long and useful service life. It is also highly effective in operation and easily controllable even by an unskilled operator.

Yet a further object of the present invention is to provide spray gun apparatus of the aforedescribed nature which is adapted to simultaneously apply upon a surface a liquid plastic together with various additive materials such as aggregate, glass fibers, gravel, sand, colorings, asbestos, wood fibers, glass beads, insulating material such as exploded mica, waxes and the like. Various liquids may likewise be sprayed by the third barrel, as well as combinations of different materials.

It is an additional object of the present invention to provide spray gun apparatus of the aforedescribed nature which employs a heated fluid such as hot air whereby flow of materials therethrough is assured under all conditions.

An additional object is to provide spray gun apparatus of the aforedescribed nature adapted to discharge solely hot fluid upon the object to be sprayed and subsequently liquid plastic, said spray gun having but a single trigger for effecting control over such spraying operations.

Yet a further object of the present invention is to provide spray gun apparatus of the aforedescribed nature utilizing several means of feeding materials into the third barrel.

It is an important object of the present invention to provide a method of simultaneously coating an object with a liquid plastic of the polyester resin type and either a solid or a semi-fluid material whereby upon curing of such plastic the other material will be thoroughly bonded to the object.

Another object of the invention is to provide a method and apparatus for simultaneously applying a liquid plastic and a glass fiber roving to an object so as to form a matting in situ on the object.

These and other objects and advantages of the present invention will become apparent from the following detailed description when taken in conjunction with the appended drawings wherein:

FIGURE 3 is an enlarged vertical sectional view taken on line 3—3 of FIGURE 1;

FIGURE 4 is a horizontal sectional view taken on line 4—4 of FIGURE 3;

FIGURE 5 is a diagrammatic view showing the operation of the preferred form of spray gun apparatus embodying the present invention;

FIGURE 6 is a fragmentary vertical sectional view showing a modification of the apparatus of FIGURES 1 through 5;

FIGURE 7 is a fragmentary side elevational view showing another modification of the apparatus of FIGURES 1 through 5;

FIGURE 8 is a diagrammatic view showing the operation of a second form of spray gun apparatus embodying the present invention;

FIGURE 9 is a diagrammatic view showing the operation of a third form of spray gun apparatus embodying the present invention;

FIGURE 10 is a fragmentary vertical sectional view of a venturi device utilized in the apparatus of FIGURE 9;

FIGURE 11 is a diagrammatic view showing the operation of a fourth form of spray gun apparatus embodying the present invention;

FIGURE 12 is a side elevational view of the spray gun apparatus shown in FIGURE 11;

FIGURES 13 and 14 are vertical sectional views taken along line 13—13 of FIGURE 12; and FIGURE 15 is a diagrammatic view showing the operation of a fifth form of spray gun apparatus embodying the present invention.

Figure 1:
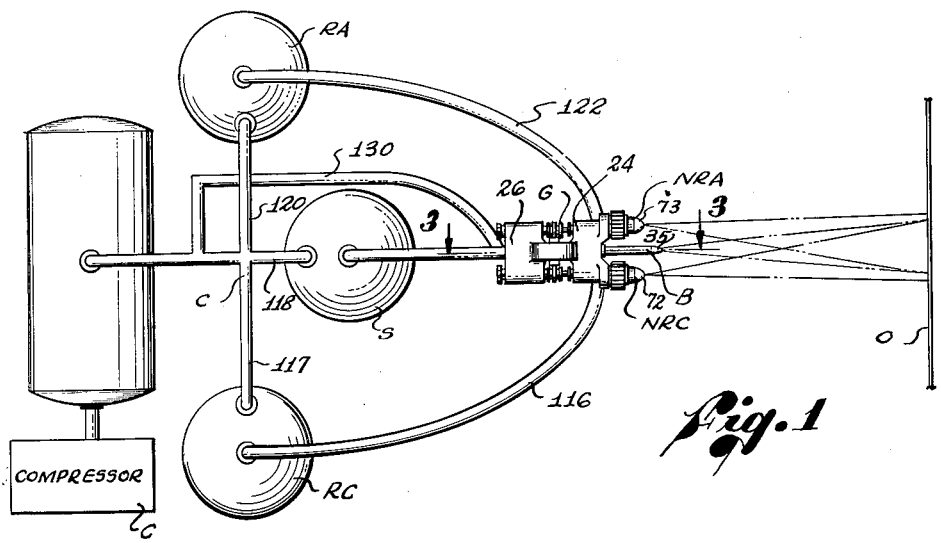
FIGURE 1 is a top plan view showing the mode of operation of a preferred form of spray gun apparatus embodying the present invention.
Figure 2:
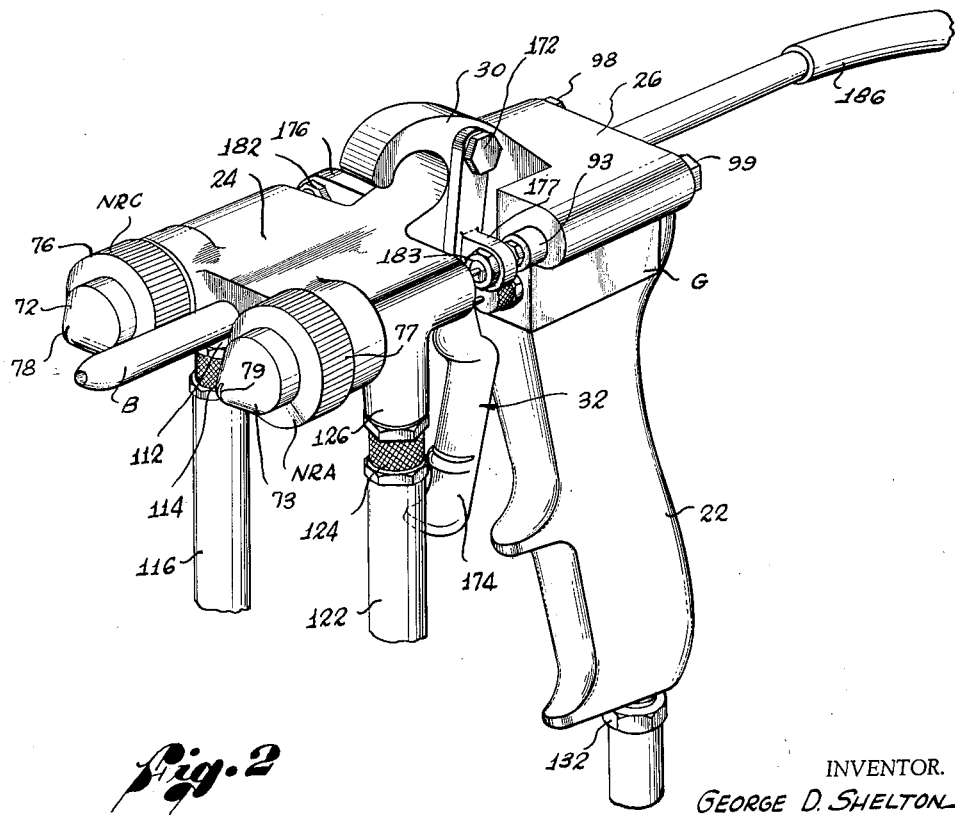
FIGURE 2 is an enlarged perspective view of said spray gun apparatus.

Referring to the drawings and particularly FIGURES 1 through 5 thereof, a preferred form of spray gun apparatus G embodying the present invention includes a pair of nozzles NRC and NRA between which is disposed a third barrel B, a source of compressed air such as a conventional electric motor-powered compressor and tank, two containers designated RC and RA and a third container designated S. The three containers RC, RA and S and the compressor tank are connected to the spray gun G by flexible conduits C in a manner to be fully described hereinafter. The container RC contains a solution of polyester resin and a suitable catalyst, the container RA contains a solution of polyester resin and a suitable chemical accelerator, and the container S contains an additive material. The contents of these three containers pass through the spray gun G and converge upon an object to be sprayed O spaced forwardly of the gun, as shown clearly in FIGURE 1. When these solutions converge in this manner, curing action of the liquid plastic will commence immediately and accordingly the polyester resin may cure very rapidly upon the object O, the actual rate being proportional to the percentage of catalyst and accelerator utilized in making up the two solutions. As these liquid plastics cure, the additive material forced through the third barrel B will be bonded to the object O.

With reference now to FIGURES 3 and 4, the spray gun G includes as integral main body, generally designated 20, which may be cast in metal and includes a depending handle or grip 22 at its rear portion. The body 20 is symmetrical about a vertical plane extended longitudinally through the center of this handle 22. The front portion of the body 20 is formed with a horizontally extending support arm 24 for the two nozzles NRC and NRA while the rear portion thereof is formed with a similar support arm 26 for a pair of needle valves generally designated 28 and 29 that cooperate with the two nozzles NRC and NRA, respectively, in controlling the liquid flow therethrough. A mounting bracket 30 for a trigger, generally designated 32, extends upwardly from the center portion of the body 20. Conveniently, the front part of this mounting bracket 32 will be curved forwardly so as to define a mounting hook for the spray gun.

The midportion of the body 20 is formed with a main air passage 34 having a longitudinal axis parallel to and in alignment with the axes of the aforedescribed nozzles NRC and NRA. The front portion of this main air passage 34 is internally threaded and receives the externally threaded rear portion of a discharge nozzle 35. A tube 36 of smaller outside diameter than the main air passage 34 extends through this passage with its front end telescopically received by the rear portion of the discharge nozzle 35. The tube 36 extends rearwardly of the rear end of the main air passage 34 and the rear portion of this passage is of reduced diameter corresponding to the outside diameter of the tube. The extreme rear end of the main air passage 34 is internally threaded so as to receive an externally threaded boss 37 formed on the tube 36.

Referring particularly to FIGURE 4, the nozzles NRC and NRA are identical in construction and they each include a generally cylindrical insert member, generally designated 40 and 41 formed at its intermediate portion with an externally threaded boss 42, 43 which is screwed into a complementary internally threaded socket 44, 45 formed at one side of the front of the support arm 18 of body 14. The socket 44 and its counterpart 45 formed in the other side of the support arm 24 are each coaxial with horizontal passages 54 and 55. Each insert member 42, 43 is formed with a coaxial bore 48, the front end of which is tapered radially inwardly and forwardly so as to merge into a discharge port 50. The rear end of each socket 44, 45 merge into a radially inwardly and rearwardly tapering pocket 52, 53. The rear end of each pocket 52, 53 merges into a coaxial passage 54, 55 with the rear ends of such passages merging into coaxial bores 56, 57. The rear ends of the latter in turn merge into the front end of internally threaded cavities 58, 59. A pair of rearwardly and inwardly extending auxiliary air passages 60, 61 connect the pockets 52 and 53, respectively, with the front portion of the main air passage 34. A mounting nut 62, 63 is formed on each insert member 40 and 41 forwardly of the bosses 42 and 43, respectively. A plurality of forwardly and inwardly inclined air passages 70 extend through each of the two insert members 40, 41.

The insert members 40, 41 each support a forwardly and inwardly tapering air tip member, generally designated 72, 73, of generally hollow, frusto-conical configuration. The rear end of these air tip members 72, 73 are each formed with an annular lip 74, which lips are secured in coaxial abutment with the front end of the insert members 40, 41, respectively, by means of lock rings 76 and 77. The latter are internally threaded so as to engage complementary external threads formed on the sockets 44 and 45. The front end of each air tip member is coaxially formed with a spray aperture 78 and 79 disposed forwardly of the discharge ports 50. The rear end of each spray aperture 78 and 79 communicate with a mixing cavity 80 formed in the front portion of the air tip members 72 and 73. The diameter of each cavity 80 is slightly greater than that of a neck 82 formed upon the front of each insert member 40, 41, the discharge port 50 extending through the neck 82. With this arrangement, a cylindrical air-transfer space 83 is defined between the exterior of each neck 82 and the internal rear portion of each cavity 80. It should be particularly observed that the axes of each of the spray apertures 78 and 79 are inclined towards one another whereby a line drawn along each axis will meet at a point spaced forwardly of the spray gun G on the center line thereof.

The needle valves 28 and 29 are identical in construction and each include an elongated needle element 90, 91 mounted for reciprocal movement along its longitudinal axis. The front of each needle element has a point which is disposed adjacent the rear of the discharge port 50 of its respective nozzle so as to control the flow of fluid therethrough. The intermediate portion of each needle element includes a collar 92, 93, the rear portion of which is slidably disposed within bores 94, 95 formed within the outer portion of the support arm 26 of the body 20. The rear portion of each bore 94, 95 is internally threaded so as to receive the externally threaded boss 96, 97 of adjustment knobs 98, 99. Each adjustment boss 96, 97 is formed with a blind bore 100 that receives a coil compression spring 102, 103 with the front end of such spring abutting the rear portion of the collars 92 and 93 of the needle valves. The front portion of each needle element is slidably supported within the bores 56, 57 of the support arm 24. A pair of externally threaded packing glands 104 and 105 are secured within the internally threaded cavities 58 and 59, respectively.

The solution of polyester resin and catalyst enters the rear interior of the nozzle NRC by means of the horizontal passage 54 extending rearwardly therefrom. This solution is fed into the intermediate portion of the passage 54 through a vertical passage 110 formed in a boss 112 that depends from the mounting arm 24 below this passage 54. The boss 112 is formed with a suitable fitting 114 that is secured to one end of a length of flexible conduit 116. The other end of this conduit 116 is connected to the container RC, as shown in FIGURE 1. The interior of this container RC is maintained at super-atmospheric pressure by means of the compressor C. To this end, a short length of flexible conduit 117 extends from the upper end of the container RC to a feeder conduit 118 connected to the compressor tank. The feeder conduit 118 is also connected to another length of conduit 120 which is connected to the upper end of the other container RA. The feeder conduit 118 is directly connected to the container D. With this arrangement, the three containers RC, RA and D may be maintained at the same pressure. A length of flexible conduit 122 similar to conduit 116 extends from the container RA to a fitting 124. The latter fitting 124 is formed in a second mounting boss 126 that depends from the arm 24 below passage 55 and this boss is formed with a vertical passage 128 connected with passage 55.

The air feeder line 118 is also connected to a length of flexible conduit 130. The opposite end of this flexible conduit 130 is formed with a fitting 132 that is threadably received by an internally threaded socket 134 formed at the lower end of the handle 22. This socket merges into an upwardly extending air passage 136. The upper end of this air passage 136 is in communication with an air-receiving chamber 138. Within the front portion of this air-receiving chamber 138 there is disposed an air valve AV having a hollow valve body 140, this valve body 140 being threadably secured within the front portion of the air-receiving chamber 138. The valve body 140 slidably carries a valve stem 142 that is parallel to the needle valves 28 and 29. A poppet element 144 is affixed to the valve stem 142 and is normally urged into sealing engagement with a seat 146 formed at the rear end of the valve body 140 by a coil compression spring 148. The rear end of this spring 148 is received within a bypass cavity 150 formed in the handle 122 rearwardly of the air-receiving chamber 138. The valve body 140 is formed with a plurality of discharge ports 152 which serve to transfer air from the air-receiving chamber 138 to an upwardly and rearwardly extending passage 160 that is in communication at its upper end with the main air passage 34 when the poppet element 144 is arranged in its open position of FIGURES 3, 4 and 5. The bypass cavity 150 is in communication with an upwardly and forwardly extending bypass passage 162 that is in communication at its upper end with the interior of the tube 36. A suitable valve 164 is disposed within the lower portion of this bypass passage 162 so as to control the volume of air flowing therethrough.

The front end of the valve stem 142 extends through a packing gland 170 and is adapted to be engaged by the rear of an abutment surface 171 formed on the intermediate portion of the trigger 32. The upper end of the trigger 32 is pivotally connected to the mounting bracket 30 by means of a horizontal pivot pin 172. The lower portion of the trigger 32 is formed with a finger grip 174. As shown particularly in FIGURE 4, the trigger 32 is formed with a pair of outwardly extending ears 176 and 177. These ears 176 and 177 are formed with a pair of internally threaded bores 177 and 178 that receive a pair of bushings 180, 181. These bushings 180, 181 are externally threaded and are secured within the bores 177 and 178 of the ears 176, 177 by nuts 182, 183. The rear end of these bushings 180 and 181 are adapted to abut the front end of the collars 92 and 93, respectively, of the needle valves 28, 29.

In the operation of the aforedescribed spray gun apparatus, rearward pivotal movement of the trigger 32 from its normal position to that shown in FIGURES 3 and 4 will cause the abutment surface 171 to engage the front end of the valve stem 142 and in turn move this valve stem rearwardly. Such rearward movement of the valve stem 142 will unseat the poppet valve element 144 from its seat 146 so as to admit a blast of air from the air-receiving chamber 138 through the air-receiving chamber 138 and passage 136 into the rear portion of the main air passage 34. At the same time, assuming the valve 164 to be open, air from the air-receiving chamber 138 will flow upwardly through the bypass passage 162 into the rear portion of the tube 36. The rear end of this tube 36 is connected with the container S by a flexible conduit 186, and since, as mentioned hereinbefore, the interior of the container S is at superatmospheric pressure, the additive material contained therein will be forced through the conduit 186, forwardly along the tube 36 and thereafter through the discharge nozzle 35 and out the front end thereof. At the same time the bushings 180 and 181 will abut the collars 92 and 93 so as to effect rearward movement of the needle elements 90 and 92 away from the rear end of the discharge ports 50. In the meantime, pressurized air from the passage 34 will flow forwardly over the exterior of the tube 36 through the auxiliary passages 60 and 61 and the passages 70 of the nozzles NRA and NRC into each mixing cavity 80. The solutions of polyester resin and catalyst and polyester resin and accelerator will thus be forced through the spray apertures 78 and 79 in an atomized condition so as to converge at a point ahead of the spray gun, as indicated by the dotted lines shown in FIGURE 1. Concurrently, as also indicated by dotted lines in this figure, the additive material emerging from the discharge nozzle 35 of the third barrel B will be directed into the stream of liquid plastic and upon the face of the object O. The aforedescribed operation is shown diagrammatically in FIGURE 5.

It should be noted that the use of the parallel needle valves 28 and 29 which are in alignment with the valve stem 142 permits the use of a simple yet effective actuating trigger mechanism for the spray gun. The amount of trigger pull required to actuate the valves may be controlled by manipulation of the adjustment knobs 98 and 99.

Referring now to FIGURE 6 there is shown a modified form of discharge nozzle 35' usable with the aforedescribed spray gun apparatus of FIGURES 1 through 5. The modified discharge nozzle 35' is flared radially outwardly at its front portion. This is in contradistinction to the radially inwardly curved discharge nozzle 35 shown in the preceding figures. It should be understood that the front portion of the discharge nozzle may assume various configurations in accordance with the type of additive material being forced through the third barrel B and the desired pattern to be assumed upon the object O by such materials.

Referring now to FIGURE 7, there is shown another modification of the preferred form of spray gun apparatus of FIGURES 1 through 5. In this case the rear portion of the tube 36 disposed exteriorly of the rear end of the gun body 20 is formed with a downwardly extending branch 200. The lower portion of this branch 200 is provided with a suitable fitting 202 which is connected to a flexible conduit 204. With this arrangement, it is possible to urge additional material into the rear end of the third barrel B, which material is intermixed with the material entering this barrel through the conduit 186. Such additional material may be supplied from yet another pressurized container (not shown) similar to container S, or from some other suitable source.

Referring now to FIGURE 8, there is shown a diagrammatic view depicting the operation of a second form of spray gun apparatus embodying the present invention. In this embodiment, the third barrel B does not extend completely through the gun body so as to permit the introduction of an additive material from the rear thereof. Instead, this additive material enters the third barrel B forwardly of the intersection of the auxiliary air passages 60 and 61 with the main air passage 34 by means of a downwardly inclined tube 210. Moreover, the tube 36 is eliminated in this form of apparatus. As also indicated in FIGURE 8, the polyester resin and catalyst enters the nozzle NRA through a downwardly extending conduit 212 while the polyester resin and accelerator enters the other nozzle NRC through a downwardly extending conduit 214. In other respects, the construction and operation of this second form of spray gun apparatus may be similar to that described hereinbefore in conjunction with FIGURES 1 through 5.

Referring now to FIGURE 9, there is shown a diagrammatic view depicting the operation of a third form of spray gun apparatus embodying the present invention. In this form of the invention, the tube 36 is again eliminated and the third barrel B does not extend through the rear of the gun body so as to permit the introduction of the additive material therethrough. Instead, this material is introduced into the third barrel B forwardly of the intersection of the auxiliary air conduits 60 and 61 with the main air passage 34 through a conduit 216. The introduction of this additive material at this point is effected by or assisted by a conventional venturi device V arranged within the third barrel, the conduit 216 being in communication with the throat 220 of such venturi device V. The details of this venturi device are shown in FIGURE 10. Referring to FIGURE 10, the necessary reduction of pressure at the throat 220 of the venturi device V is provided by the forward flow of compressed air through the main air passage 34 of the third barrel B. The mixture of polyester resin and catalyst enters the nozzle NRA through a conduit 122, as in the case of the spray gun apparatus of FIGURES 1 through 5. Similarly, the mixture of polyester resin and accelerator enters the nozzle NRC through a conduit 116. The other details of construction of this third form of spray gun apparatus may be similar to those of the preferred form of spray gun apparatus.

Referring now to FIGURES 11 through 14, there is shown a fourth form of spray gun apparatus embodying the present invention. In this form of the invention the tube 36 of the third barrel B extends through the rear end of the gun body so as to permit the introduction of the desired additive material therethrough, as in the case of the spray gun apparatus of FIGURES 1 through 5. Additionally, the interior of the rear end of the gun barrel B is adapted to be placed in communication with the air-receiving chamber 138 by means of a bypass passage 162 within which is disposed a valve 164.

It is a particular feature of this form of spray gun apparatus that a control valve CV is disposed in the third barrel B forwardly of the intersection of the auxiliary air branch conduits 60 and 61 with the main air passage 34. This control valve CV is adapted to selectively block the flow of air through the main air passage 34 of the gun body and hence through the discharge nozzle 35. The control valve CV includes a rear ring 222 coaxial with tube 36 which abuts a coaxial front ring 224. The rear ring 222 is formed with a plurality of circumferentially spaced apertures 226, while the front ring 224 is formed with a plurality of similarly spaced apertures 228. The two rings 222 and 224 are rotatable relative to one another whereby the aforementioned ports 226 and 228 may be either aligned or misaligned. When these ports are in alignment, as shown in FIGURE 14, the front portion of the main air passage 34 will be placed in communication with the rear portion thereof. When, however, these ports are misaligned, as shown in FIGURE 13, a communication between the front and rear portions of the main air passage 34 will be effectively blocked.

Referring particularly to FIGURE 12, it is another feature of this form of the invention that the valve stem 142 of the air valve AV will be moved to an open position prior to the time that the needle valves 28 and 29 are opened relative to the nozzles NRC and NRA. As shown clearly in this figure, initial rearward movement of the trigger 32 will serve to effect concurrent rearward opening movement of the valve stem 142 of the air valve AV. At this time, compressed air will be admitted into the rear of the main air passage 34. Continued rearward pivotal movement of the trigger 32 will serve to engage the bushings 180 and 181 with the front end of the needle valve collars 92 and 93. Thereafter still further continued rearward pivotal movement of the trigger 32 will serve to retract the needle elements 90 and 91 from the discharge ports 50 of the nozzles NRC and NRA. Hence, it is possible to direct a charge of compressed air through the third barrel B prior to the time that liquid plastic begins to flow to the nozzles NRC and NRA. This arrangement proves especially desirable when it becomes necessary to raise the temperature of the object being sprayed prior to the time the liquid plastic is directed thereupon, as may be the case in a cold climate. Thus, heated air may be directed through the conduit 130, such air being supplied from a separate source other than the aforementioned air compressor, or alternately being passed through a heater after leaving this compressor. Assuming the control valve CV to be in an open position, such heated air will be directed through the front of the third barrel B by initial rearward movement of the trigger 32. Thereafter, the trigger may be depressed further so as to admit liquid plastic through the nozzles NRC and NRA. The flowability of such plastic will be aided by the use of heated air. Where this arrangement is employed, it is desirable to dispose another valve 230 at the rear end of the third barrel B so as to be able to cut off the flow of additive material through the third barrel B during the time the object to be sprayed is being heated.

Referring now to FIGURE 15, there is shown a fifth form of spray gun apparatus embodying the present invention. This form of spray gun apparatus is generally similar to that shown in FIGURES 1 through 5. It is particularly adapted, however, to direct a roving or filament 240 of a desired material through the third barrel B. In practice, rovings of glass or synthetic plastic fibers have proven to be effective. The roving 240 is shown entering the open rear end of the tube 36 of the third barrel B from a suitable spool or skein 242. It has been found desirable to have the upper end of the bypass conduit 162 provided with a forwardly directed nozzle 244 so as to assist in forcing the roving 240 through the tube 36 of the third barrel B. It is possible by the use of this form of spray gun apparatus to form a glass fiber and polyester resin type plastic matting in situ upon a desired object. This may be accomplished with a minimum amount of effort and by the use of a minimum amount of materials. Additionally, the formation of such webbing may be accomplished rapidly and with little manual effort.

From the foregoing description it will be seen that the present invention provides means for simultaneously applying liquid plastics and various additive materials to an object. As noted hereinabove, the additive materials may take various forms and they may be either solid, semi-fluid ro liquid. In each case, the additive material is thoroughly wetted by the atomized liquid plastic before reaching the object being sprayed. Accordingly, upon reaching such object the additive material assumes a strong bond therewith. The aforedescribed spray gun apparatus may be used to apply a coating to an object which is either solid or of lattice-like construction. Although liquid plastics of the polyester resin type have been mentioned in conjunction with the aforedescribed spray gun apparatus, it will be apparent that various other liquid plastics may be employed. In practice, although several types of catalysts are readily commercially available for the polyester resin, it has been determined that methyl ethel ketone peroxide is very effective. Another catalyst which may be utilized is made up of equal parts of a benzoyl peroxide base and tricresyl phosphate. With regard to a suitable accelerator, either a six percent cobalt or a dimethyl aniline has proven satisfactory. It has been found that the solution of polyester resin and catalyst should contain approximately three quarters to one percent catalyst and that the solution of polyester resin and accelerator should contain approximately one half to one percent accelerator. Other types of catalysts and accelerators utilized in different percentages, however, may also prove satisfactory in carrying out the invention.

It will also be apparent that various modifications and changes may be made with respect to the foregoing description without departing from the spirit of the invention or the scope of the following claims.

I claim:

1. Spray gun apparatus, comprising: a spray gun having a main body; a spaced-apart pair of parallel horizontal passages formed in said body; a nozzle disposed in the front portion of each of said passages; a spray aperture formed in each of said nozzles with the axes of said apertures being inclined towards one another; means attached to said body for connecting one of said horizontal passages with a first solution; means attached to said body for connecting the other of said horizontal passages with a second solution; a main air passage formed in said body parallel with said horizontal passages; a discharge nozzle at the front end of said main air passage; a tube extending longitudinally through said main air passage; means attached to said body for connecting said tube with an additive material; auxiliary air passages in said body interconnecting said main air passage and said horizontal passages; an air supply passage in said body connecting said main air passage with a source of pressurized air; a bypass air passage in said body interconnecting said air supply passage with said tube; and trigger means on said body controlling the flow of air through said air supply passage.

2. Spray gun apparatus, comprising: a spray gun having a main body; a spaced-apart pair of parallel horizontal passages formed in said body; a nozzle disposed in the front portion of each of said passages; a spray aperture formed in each of said nozzles with the axes of said apertures being inclined towards one another; means attached to said body for connecting one of said horizontal passages with a first solution; means attached to said body for connecting the other of said horizontal passages with a second solution; a main air passage formed in said body parallel with said horizontal passages; a discharge nozzle at the front end of said main air passage; a tube extending longitudinally through said main air passage; means attached to said body for connecting said tube with an additive material; auxiliary air passages in said body interconnecting said main air passage and said horizontal passages; an air supply passage in said body connecting said main air passage with a source of pressurized air; a bypass air passage in said body interconnecting said air supply passage with said tube; valve means controlling the flow of air through said bypass air passage; and trigger means on said body controlling the flow of air through said air supply passage.

3. Spray gun apparatus, comprising: a spray gun having a main body; a spaced-apart pair of horizontal passages formed in said body; a nozzle disposed in the front portion of each of said passages; a spray aperture formed in each of said nozzles; means attached to said body for connecting one of said horizontal passages with a first solution; means attached to said body for connecting the other of said horizontal passages with a second solution; a main air passage formed in said body; a discharge nozzle at the front of said main air passage; a tube extending longitudinally through said third horizontal passage; means attached to said body for connecting said tube with an additive material; auxiliary air passages in said body interconnecting said main air passage and said pair of parallel horizontal passages; an air supply passage in said body connecting the rear portion of said main air passage with a source of pressurized air; bypass air passage means in said body interconnecting said air supply passage with the rear portion of said tube; and trigger means on said body controlling the flow of air through said air supply passage.

4. Spray gun apparatus, comprising: a spray gun having a main body; a spaced-apart pair of horizontal passages formed in said body; a nozzle disposed in the front portion of each of said passages; a spray aperture formed in each of said nozzles; means attached to said body for connecting one of said horizontal passages with a first solution; means attached to said body for connecting the other of said horizontal passages with a second solution; a main air passage formed in said body; a tube disposed within said main air passage and extending through the rear end of said main body; means on said tube for connecting the rear end of said tube with an additive material; auxiliary air passages in said body interconnecting the front portion of said main air passage and said pair of horizontal passages; a discharge nozzle at the front of said main air passage; an air supply passage connecting the rear portion of said main air passage with a source of pressurized air; bypass air passage means in said body interconnecting said air supply passage with the rear portion of said tube; and trigger means on said body controlling the flow of air through said air supply passage.

References Cited in the file of this patent

UNITED STATES PATENTS

| | | |
|---|---|---|
| 1,686,003 | Hottinger | Oct. 2, 1928 |
| 1,881,345 | Beatty et al. | Oct. 4, 1932 |
| 2,136,024 | Schneider | Nov. 8, 1938 |
| 2,255,189 | Robinson et al. | Sept. 9, 1941 |
| 2,313,082 | MacDonald | Mar. 9, 1943 |
| 2,370,408 | MacDonald | Feb. 27, 1945 |
| 2,380,827 | Downs | July 31, 1945 |
| 2,458,220 | Striegel et al. | Jan. 4, 1949 |
| 2,563,457 | Dolbey | Aug. 7, 1951 |
| 2,739,843 | Baur | Mar. 27, 1956 |
| 2,786,716 | Peeps | Mar. 26, 1957 |
| 2,787,314 | Anderson | Apr. 2, 1957 |
| 2,813,751 | Barrett | Nov. 19, 1957 |